Figure 1:
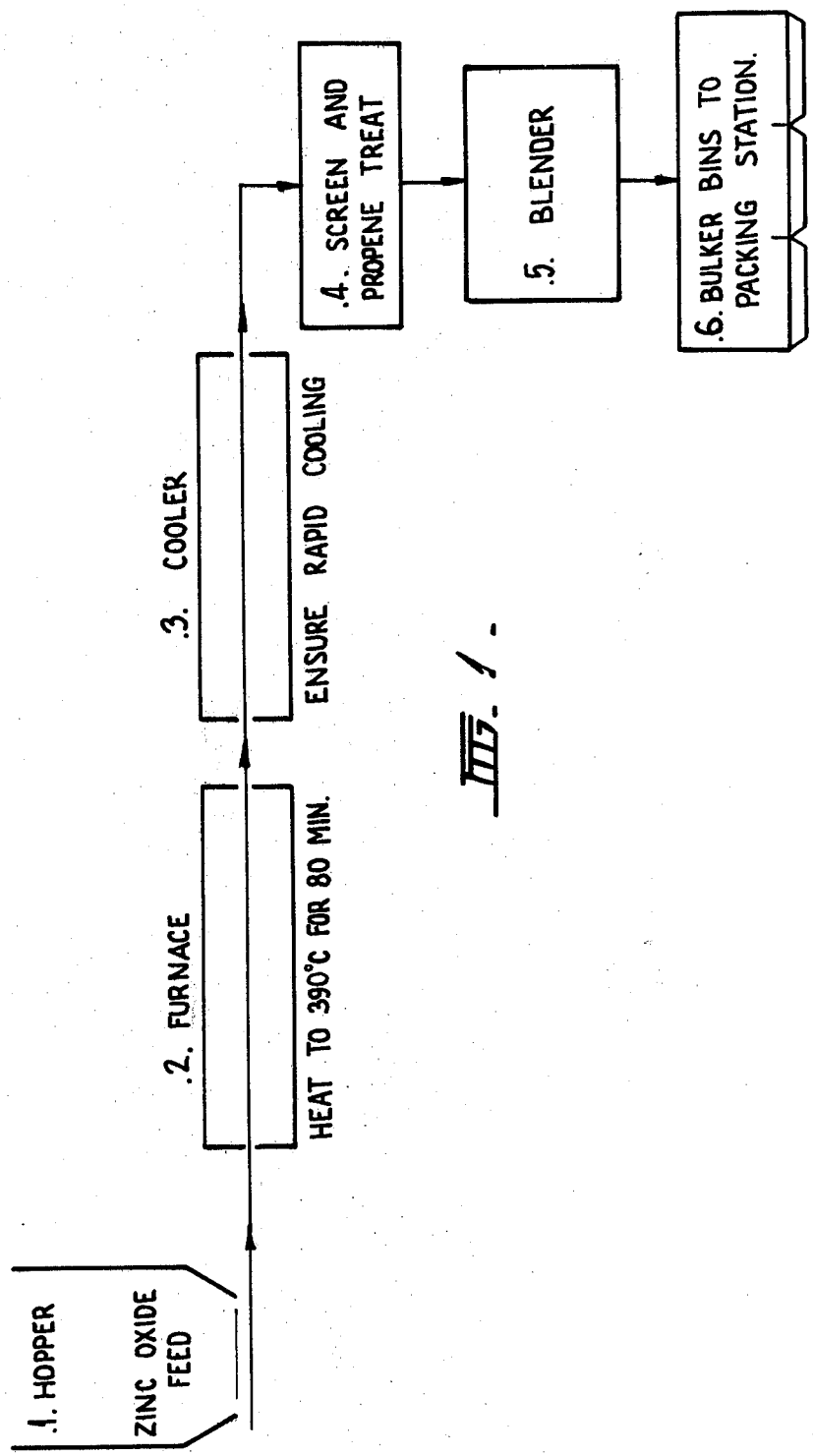

United States Patent [19]

Christesen et al.

[11] 4,160,668

[45] Jul. 10, 1979

[54] ELECTROPHOTOGRAPHIC GRADE ZINC OXIDE

[75] Inventors: Paul J. Christesen, Annandale; Geoffrey R. Sanders, Rowville, both of Australia

[73] Assignees: The Broken Hill Proprietary Company Limited; The Lysaght Durham Chemical Company Proprietary Limited, both of Victoria, Australia

[21] Appl. No.: 823,847

[22] Filed: Aug. 11, 1977

Related U.S. Application Data

[63] Continuation of Ser. No. 674,724, Apr. 6, 1976, abandoned.

[30] Foreign Application Priority Data

Apr. 11, 1975 [AU] Australia ............................. 1202/75

[51] Int. Cl.² ...................... G03G 5/08; H01C 13/00; G01G 9/02

[52] U.S. Cl. ...................................... 96/1.8; 423/622; 252/501

[58] Field of Search .................. 96/1.8, 1.29; 423/107, 423/99, 622; 252/501, 518

[56] References Cited

U.S. PATENT DOCUMENTS

| | | | |
|---|---|---|---|
| 2,416,044 | 2/1947 | Calbeck | 423/622 |
| 2,844,436 | 6/1958 | Baker et al. | 423/622 |
| 3,507,693 | 4/1970 | Ueda | 96/1.8 |

Primary Examiner—J. Travis Brown
Assistant Examiner—L. Falasco
Attorney, Agent, or Firm—Cushman, Darby & Cushman

[57] ABSTRACT

A process for the production of electrophotographic grade zinc oxide which comprises heating zinc oxide to a temperature of between 150° C. and 800° C. and then treating the heat treated zinc oxide with an organic compound having at least two carbon atoms and containing an alkene group.

23 Claims, 3 Drawing Figures

ELECTROPHOTOGRAPHIC GRADE ZINC OXIDE

This is a continuation of application Ser. No. 674,724, filed Apr. 6, 1976, now abandoned.

This invention relates to improvements in the production of electrophotographic grade zinc oxide, particularly zinc oxide which has been processed or treated to render it suitable for electrophotographic copying applications, e.g. as a coating for electrophotographic copying paper. The invention also relates to a process for improving the electrophotographic photosensitivity of zinc oxide.

An object of this invention is to provide an improved process for the treatment of zinc oxide, e.g. commercial grade zinc oxide, to produce processed or treated zinc oxide which is suitable for electrophotographic purposes (hereinafter termed "E.P. zinc oxide"), which process is novel, is economically viable, and which produces a superior grade product. A further object is to provide a process which is capable of upgrading the electrophotographic properties of existing E.P. zinc oxides.

In one broad form, the process of this invention comprises treating zinc oxide with an organic compound containing an alkene group, preferably an alkene compound containing more than two carbon atoms, and more preferably an alkene compound containing from 3 to 5 carbon atoms. Preferably the organic reagent is in gaseous form. Preferably the zinc oxide is heated before the treatment with the reactant, the heat treatment being desirably at a temperature between 150° C. and 800° C., and preferably at a temperature between 350° C. and 430° C., most preferably at a temperature of 390° C.±15° C., for a period of between 20 minutes and 5 hours, preferably between 40 minutes and 100 minutes. A residence period of about 80 minutes±10 minutes has been found satisfactory.

The alkene compound employed is preferably propene (propylene), preferably in gaseous form, but other alkenes or alkene group organic compounds, such as ethene (ethylene), butene (butylene), pentene, and isoprene, and dienes, such as butadiene, may be employed, also preferably in gaseous form.

The heated zinc oxide is preferably cooled or quenched to a temperature of less than 100° C. in less than one hour, preferably to room temperature in less than one hour, prior to the treatment with propene or other alkene compound. The cooled zinc oxide is optionally screened before the treatment with the organic reagent.

The raw zinc oxide used may be that known commercially as White Seal Zinc Oxide as manufactured by The Lysaght Durham Chemical Co. Pty. Ltd., or alternatively, an equivalent high purity grade zinc oxide such as that manufactured by the French process may be used.

The said treatment of zinc oxide with gaseous propene or other alkene compound is preferably effected by intimately contacting the zinc oxide particles with the organic reagent. Where gaseous reagents are used this may be achieved by passing the zinc oxide through a fine mesh screen into a chamber containing the gaseous reactant. Reactants may be fed into and reacted in a mechanical blender or other suitable apparatus.

The treated zinc oxide may be blended with suitable blending material and with or without blending may be then passed to storage bins or the like.

Figure 2:
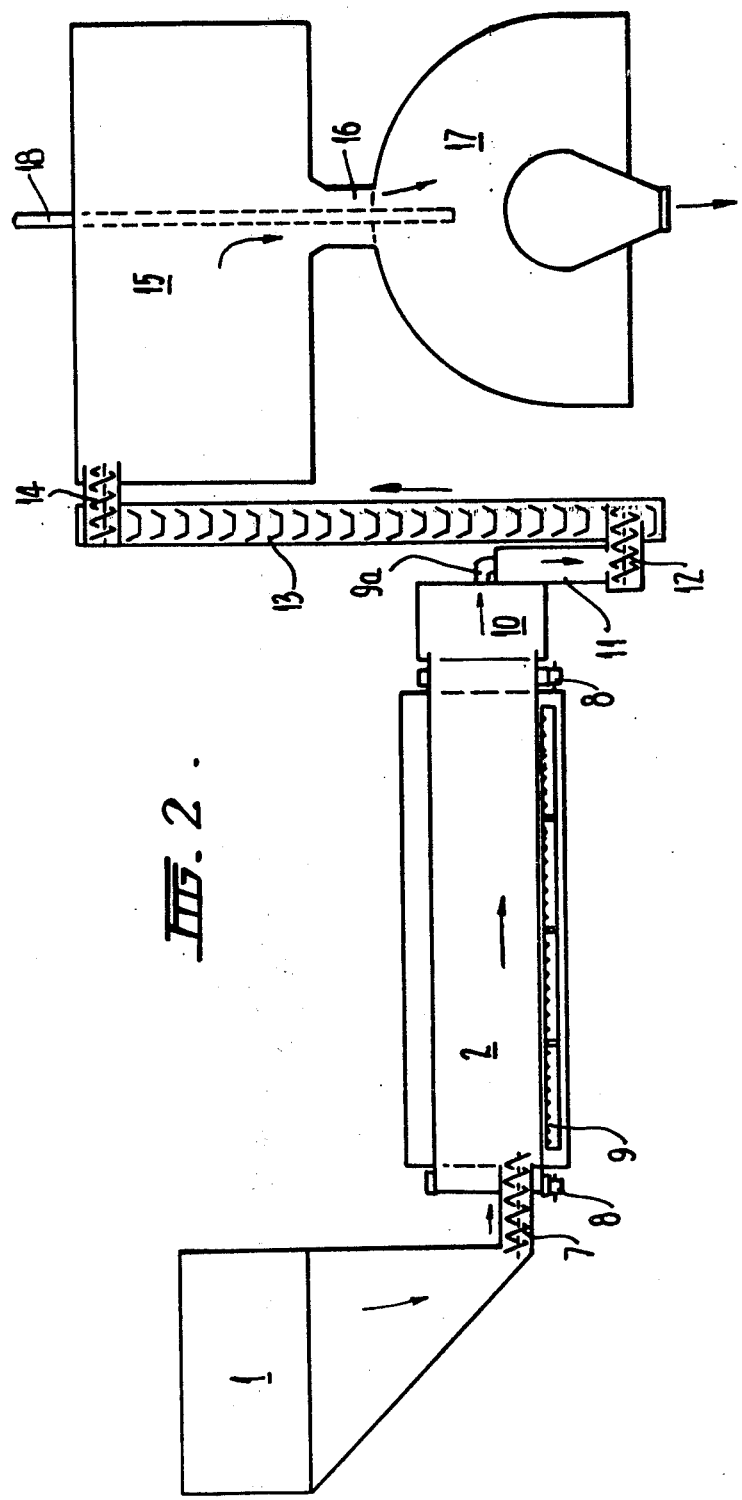
Figure 3:
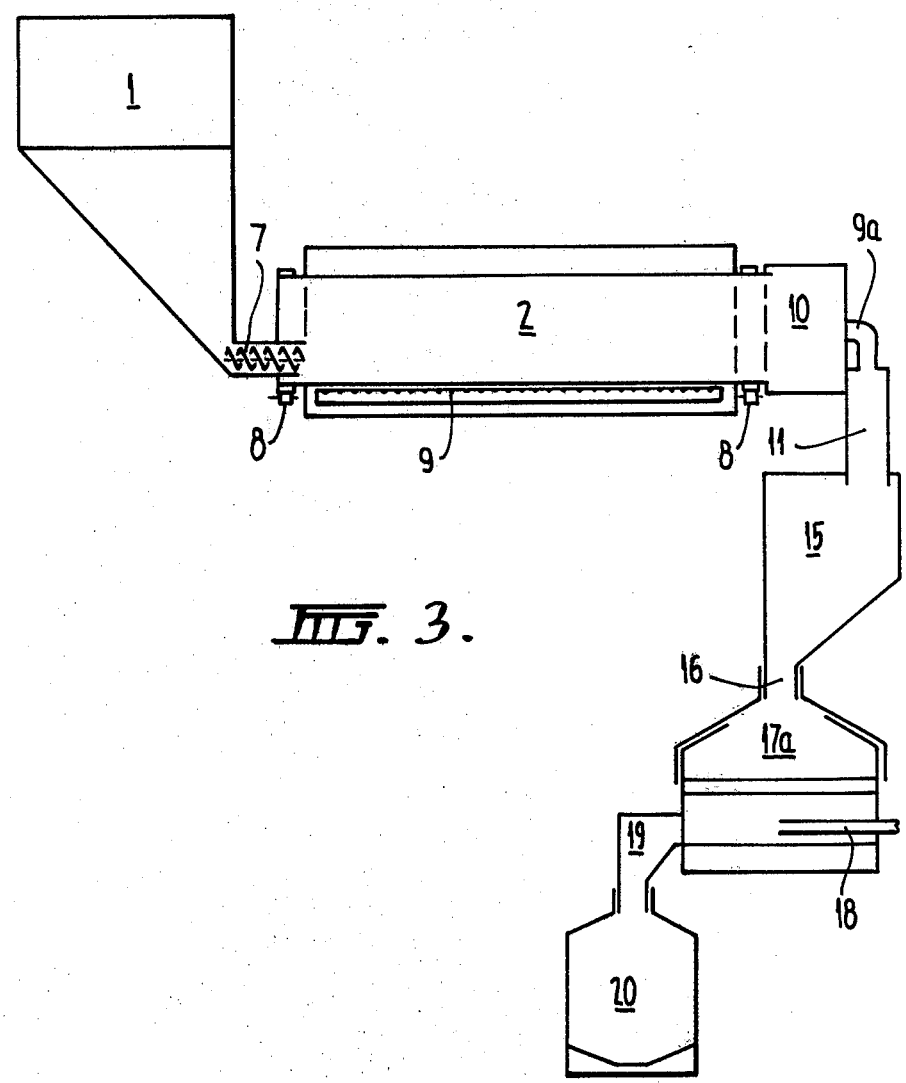

The process of this invention will now be described with reference to the preferred embodiments of the apparatus used which are shown in the accompanying drawings, wherein, FIG. 1 is a flow sheet illustrating one form of the invention, FIG. 2 is a diagrammatic view in elevation of one form of apparatus in which the process of the invention is carried out, and FIG. 3 is a diagrammatic view in elevation of a modification of the apparatus shown in FIG. 2.

According to the flow sheet shown in FIG. 1, commercial quality zinc oxide preferably having a lead content not exceeding 250 p.p.m. is fed from a hopper 1 to a furnace 2 or other heating apparatus such as a rotary kiln, static furnace, fluid bed furnace, or the like. In the case of a rotary kiln, the preferred conditions are that the kiln is maintained at about 390° C. and the residence time of the oxide is about 80 minutes.

The heated zinc oxide is then cooled rapidly in the cooler 3, which may constitute part of the rotary kiln, and the cooled zinc oxide, which may vary in temperature from ambient temperature to 100° C., may optionally be screened as indicated at 4, and is then treated with propene or other alkene compound in a suitable reaction chamber which may be a rotary blender 5 or other suitable apparatus. The treated zinc oxide is then either passed to bulker bins and a packing station as indicated at 6 or bagged directly from the blender.

Referring to FIG. 2 of the drawings the reference numeral 1 indicates the feed hopper into which the commercial grade zinc oxide is fed. The zinc oxide fed is charged by a screw conveyor 7 into a rotary kiln 2 which is preferably inclined at an angle of about 1° from the horizontal downwardly towards its discharge end. The rotary kiln 2 rotates on rollers 8 and is fired both directly and/or indirectly by natural gas by means of burners 9. The internal temperature of the rotary kiln 2 is preferably maintained at 390° C.±15° C. and the residence time of the charge in the kiln 2 is preferably about 80 minutes. This is equivalent to the charge being rapidly heated to 400° C. and maintained at that temperature for a period of about 30 minutes.

The dimensions of the kiln 2 are preferably 5 meters long by 1 meter in diameter, the charge size is approximately 250 kg, and the kiln is preferably rotated at approximately 1 r.p.m.

The cooling of the heated zinc oxide should be as rapid as possible, preferably being effected in less than 5 minutes, and this may be achieved in the cooling zone 10 of the rotary kiln 2. Cooling is preferably effected in the cooling zone 10 by flood cooling with water over the external shell of the section 10 of the kiln 2. Cooling of the heated zinc oxide is further enhanced by direct exposure to ambient air of the zinc oxide as it is discharged from the end of the kiln 2.

The zinc oxide product from the cooling zone 10 of the kiln 2 passes downwardly into hopper 11 and is transferred by screw conveyor 12 to the lower end of an elevator 13. The product is transferred from the upper end of the elevator 13 by means of a screw conveyor 14 to a holding hopper 15 (shown diagrammatically) from which it is discharged through chute 16 into a rotary blender 17 (also shown diagrammatically).

The cooled zinc oxide product from the hopper 15 is treated in the rotary blender 17 with propene gas at a temperature not exceeding 100° C. The propene gas is introduced into the blender 17 through pipe 18. Other alkene compounds, such as isoprene or butene, preferably in gaseous form, may be used as the treatment medium.

The batch size of the zinc oxide treated in the rotary blender 17 is usually 5 to 6 tonnes and each batch usually has a residence time in the blender 17 of at least 45 minutes.

In the form of the invention shown in FIG. 3 the units of the apparatus and the procedure followed are substantially the same as in the form of the invention shown in FIG. 2 and the same reference numerals are used to indicate like or corresponding parts. However, in the apparatus of FIG. 3 the zinc oxide product from the cooler 10 is not elevated as in FIG. 2 but passes downwardly via hopper 11 into a storage hopper 15 from which it is discharged through chute 16 into the screening/treatment station 17a into which propene gas is admitted through pipe 18. The treated zinc oxide after treatment with propene gas or other alkene compound in the station 17a is discharged from said station 17a through discharge passage 19 into bags or other receptacles 20.

The results of tests carried out using electrophotographic zinc oxide produced by the process of this invention, compared with similar tests using untreated zinc oxide and other commercial E.P. zinc oxides, are shown in Table 1 which follows. In this Table the zinc oxide referred to as "TREATED" was treated by the process of this invention:

ground to be copied with maximum image/background contrast.

The normal evaluation criteria for determining the electrophotographic performance of a zinc oxide are:
  (i) the electrical properties of the system,
  (ii) the copy performance in a commercial machine.

The comparative performance of various treated oxides with some commercial oxide products is shown in Table 1. To obtain these results all samples were sensitized and dispersed into a proprietary commercial resin/dye system and spread into pretreated base paper. In each case the dispersion was applied with a wire wound applicator as near as practicable to a standardized coating level, being twenty-five gram per square meter. Tests were made in a dark room at 60% R.H. and 20° C., after the paper had been dried and dark adapted for 16 hours.

Electrical response parameters were determined from a surface potential record produced on a rotating disc apparatus (Dyntest 90—an electro-recording device produced by Elektrostat. U. Chem. Entwicklung (ECE). Germany). A continuous record is made from an electrometer in the above device which monitors potential as a paper sample is put through an extended simulation of a copy cycle. In this, the sample is charged for 45 seconds with a negative corona device operating at approximately 6000 volts. The sheet is allowed to discharge for 20 seconds in the dark, then exposed to light (425 lux intensity) with consequent rapid surface

TABLE 1

Comparative Oxide Performance Electrical Response and Print Speed

| OXIDE TYPE | BATCH | TREATMENT | Pmax Volt | Dark Decay (%) | Light Decay(%) 50 lux sec | Light Decay(%) 100 lux sec | PRINT SPEED AT MAX. SETTING |
|---|---|---|---|---|---|---|---|
| Commercial Product 1 | | Untreated | 302 | 21.0 | 79 | 97 | +6 |
| Commercial Product 2 | | Untreated | 382 | 20.0 | 61 | 91 | +4 |
| Commercial Product 3 | | Untreated | 366 | 13.0 | 34 | 82 | STD |
| White Seal | A | Untreated | 382 | 16.0 | 25 | 69 | −2 |
| " | A | Treated | 340 | 13.5 | 47 | 90 | STD |
| " | B | Untreated | 387 | 22.0 | 21 | 53 | −4½ |
| " | B | Treated | 385 | 22.5 | 45 | 88 | −1 |
| " | C | Untreated | 416 | 21.0 | 36 | 77 | STD |
| " | C | Treated | 407 | 19.0 | 48 | 85 | −3½ |
| " | D | Untreated | 322 | 16.0 | 35 | 82 | −3 |
| " | D | Treated | 334 | 18.5 | 55 | 87 | +1 |
| " | E | Untreated | 346 | 15.0 | 21 | 61 | −4 |
| " | E | Treated | 354 | 18.0 | 45 | 85 | +1 |

White Seal = High purity French process zinc oxide manufactured by the Lysaght Durham Chemical Company Pty. LTd.

The following explanation of the tests referred to in Table 1 is given:

A photocopy print is obtained from a latent electrostatic charge image produced on the paper, by uniform charging and selective discharging. This image is 'developed' by attraction of carbon or pigment particles to the charged image area. Hence to obtain the optimum print quality, i.e. dense image on white background, the charge prior to light exposure must be maximized. Fast and complete discharge of the non-image section is essential to eliminate any background development. The system (zinc oxide, resin, dyes and paper) is designed to selectively eliminate colours at various machine settings, enabling printing on a coloured backcharge decay. Potential readings were obtained for Table 1 from the trace produced, during the two (2) minute cycle.

Values abstracted were:
  Maximum charge acceptance: P max (volts)
  Dark decay: % discharged
  Photo decay (after 50 and 100 lux seconds exposure: % discharged In the case of "P.max.", a high value is desired, for "Dark decay" a low value is desired, and for "Photo decay" (Light decay) a high value is desired. In the case of the treated zinc oxides, the P. max. have a range of 333 to 407 volts. The dark decay figures for these zinc oxides showed a range of 13.5% to 22.5% and light decay figures of 45% to 55%.

Copy performance is determined from the print quality obtained of a commercial test sheet, by comparison of the subject performance with a 'standardized paper' at all (usually 10) exposure settings. The master sheet has various saturation levels of red, orange, green, blue and black, and test copies are examined at the various settings for density diminution of each colour. Colour 'burn out' is primarily controlled by dye type and concentration, however results are comparable in any particular system. The system currently used is designed to eliminate the various components at the following setting:

background—2 to 3
orange—5
red—7
green—9–10
blue—9–10
black—slightly throughout the range but significantly, at high settings, with oxide faster than 'standard'

Hence at any setting a comparison can be made between test and standard sheet, which allows relative 'speed' to be determined e.g. 1, 2½ or 3 speeds variant from standard. Observable variation increased throughout the range being maximum with longest light exposure. Thus values listed in Table 1 are relative at this setting.

An examination of prints prepared from paper coated with materials using the E.P. zinc oxide of this invention, compared with prints obtained using paper treated with commercial E.P. zinc oxide produced by other processes, indicates that the former prints compare favourably with the latter.

It is believed, without in any way limiting ourselves to this or any other theoretical explanation of the process, that the desirable electrophotographic properties are imparted to the zinc oxide by the propene or other reagent being adsorbed onto activated sites on the zinc oxide, and that these active sites on the zinc oxide are increased by the heat treatment of the zinc oxide as herein described according to this invention, probably by an increase in the interstitial zinc content at the surface of the zinc oxide crystals.

It is also believed, again without in any way limiting ourselves to such an explanation, that the desired electrophotographic properties which are imparted to the zinc oxide by the process of this invention are due in part to a more even particle size distribution being achieved by means of the said process. We have found that the mean particle size of the zinc oxide as measured by an air permeability/electron microscope technique is in the range 0.25 to 0.50$\mu$ and that there is little evidence of small "colloidal" particles (e.g. 0.02 to 0.05$\mu$) in the product; the process substantially eliminates any such small particles present in the feedstock.

We have found that the electrophotographic properties of the product produced in accordance with our invention do not deteriorate upon ageing or long term storage of the treated product.

The E.P. zinc oxide produced by the process of this invention has been found to possess properties which render it eminently suitable for commercial electrophotographic applications, e.g. for coating copying paper.

We claim:

1. A process for the production of electrophotographic grade zinc oxide which comprises heating zinc oxide to a temperature of between 150° C. and 800° C., cooling the zinc oxide to a temperature below 100° C., and then treating the heat treated, cooled zinc oxide with an organic compound in the gaseous phase by contacting the gas with the zinc oxide at a temperature not exceeding 100° C., said organic compound being selected from the group consisting of propene, butene, pentene and isoprene.

2. A process according to claim 1 wherein the organic compound is propene.

3. A process according to claim 1 wherein the organic compound is isoprene.

4. A process according to claim 1 wherein the organic compound is butene.

5. A process according to claim 1 wherein the hot zinc oxide is cooled to below 100° C. in less than 5 minutes.

6. A process according to claim 1 wherein the heat treatment of the zinc oxide is at a temperature between 350° C. and 430° C.

7. A process according to claim 1 wherein the heat treatment of the zinc oxide is at a temperature of 390° C.±15° C.

8. A process according to claim 1 wherein the heat treatment of the zinc oxide is at a temperature of about 400° C.

9. A process according to claim 1 wherein the zinc oxide is heat treated for a period between 2 minutes and 5 hours.

10. A process according to claim 1 wherein the zinc oxide is heat treated for a period of between 40 minutes and 100 minutes.

11. A process according to claim 7 wherein the zinc oxide is heat treated for about 30 minutes.

12. A process according to claim 6 wherein the zinc oxide is heat treated for 80 minutes±10 minutes.

13. A process according to claim 1 wherein the lead content of the zinc oxide does not exceed 250 p.p.m.

14. A process according to claim 1 wherein the zinc oxide is heated and then cooled while being passed through a rotary kiln having a heating zone and a cooling zone.

15. A process according to claim 1 wherein the zinc oxide is heat treated in a static furnace.

16. A process according to claim 1 wherein the zinc oxide is heat treated in a fluid bed furnace.

17. A process according to claim 13 wherein the cooled zinc oxide passes from the cooling zone of the rotary kiln into a reaction vessel where the particles of zinc oxide are contacted with the organic compound in gaseous form.

18. A process according to claim 13 wherein the cooled zinc oxide passes from the cooling zone of the rotary kiln into a rotary blender where the particles of zinc oxide are contacted with the organic compound in gaseous form.

19. A process according to claim 13 wherein the cooled zinc oxide passes from the cooling zone of the rotary kiln into a rotary blender where the particles of zinc oxide are contacted with the organic compound in gaseous form, wherein the concentration of the gaseous organic compound in the atmosphere in the blender is not more than 2.0%.

20. A process according to claim 13 wherein the cooled zinc oxide passes from the cooling zone of the rotary kiln into a rotary blender where the particles of zinc oxide are contacted with the organic compound in gaseous form wherein the concentration of the gaseous organic compound in the atmosphere in the blender is 0.5%±0.1%.

21. A process according to claim 1 wherein the mean particle size of the electrophotographic zinc oxide produced is between 0.25 and 0.5µ.

22. A process for the production of electrophotographic grade zinc oxide which comprises heating particulate zinc oxide to a temperature of between 150° C. and 800° C., rapidly cooling the zinc oxide to a temperature less than 100° C., and then intimately contacting the heat-treated, cooled zinc oxide particles at a temperature below 100° C. with an organic compound in the gaseous phase, said organic compound being selected from the group consisting of propene, butene, pentene and isoprene.

23. A process as in claim 1 wherein the organic compound is pentene.

* * * * *

UNITED STATES PATENT OFFICE
CERTIFICATE OF CORRECTION

Patent No. 4,160,668          Dated July 10, 1979

Inventor(s) Paul Justus Christesen and Geoffrey Raymond Sanders

It is certified that error appears in the above-identified patent and that said Letters Patent are hereby corrected as shown below:

In Table I, far righthand column (i.e. Print Speed At Max. Setting) the ninth entry (i.e. the entry for Batch C Treated) should read --+3 1/2--.

Signed and Sealed this

Fourth Day of March 1980

[SEAL]

Attest:

SIDNEY A. DIAMOND

Attesting Officer     Commissioner of Patents and Trademarks